No. 890,827. PATENTED JUNE 16, 1908.
A. T. VIGNERON.
BATTERY.
APPLICATION FILED JAN. 16, 1907.

Witnesses
E. J. Ogden
A. L. Makepeace

Inventor
Adolph T. Vigneron
By Howard E. Barlow
Attorney

UNITED STATES PATENT OFFICE.

ADOLPH T. VIGNERON, OF PROVIDENCE, RHODE ISLAND, ASSIGNOR OF ONE-HALF TO HERBERT B. VIGNERON, OF PROVIDENCE, RHODE ISLAND.

BATTERY.

No. 890,827.

Specification of Letters Patent.

Patented June 16, 1908.

Application filed January 16, 1907. Serial No. 352,528.

*To all whom it may concern:*

Be it known that I, ADOLPH T. VIGNERON, a citizen of the United States, residing at the city of Providence, in the county of Providence and State of Rhode Island, have invented certain new and useful Improvements in Batteries, of which the following is a specification, reference being had therein to the accompanying drawing.

This invention relates to electric batteries and has for its object to provide a simple and effective battery cell holder so constructed that the cells may be removed and replaced by new ones and properly connected up again by unskilled hands without the possibility of a mistake being made.

In carrying out my invention I provide a casing or receptacle for the battery cells that is provided with electrical conductors permanently located within the walls of the same, so that when said cells are placed in position therein and the lid closed all the cells are properly connected up, this casing being provided with permanent wire connections which are not disturbed in the opening of the lid or removing of the cells.

Another feature of the invention is that the cells are preferably constructed with the positive pole at one end and the negative at the opposite end, which poles are designated by a distinguishing mark at either end such as red for the positive and black for the negative, the receptacle being correspondingly marked so that there can positively be no mistake in placing the cells therein, as the black end of the cell would go to the black portion of the receptacle and the red end to its corresponding color.

It is found in practice in the use of automobiles, launches and the like that unskilled persons often have the handling of the mechanism and when the battery, on which depends the action of the engine, is out of order these unskilled persons are usually at a loss to know how to revive or renew the working of the same. With my improved apparatus all that is necessary is to open the lid of the receptacle, remove one or more of the cells and replace them with fresh ones, it being seen at a glance by the designating colors which end should be up and which down. The cells being dropped into the casing it is only necessary to close the lid and lock the same in position and the batteries are ready for action again, positively avoiding the possibility of making mistakes.

This invention is fully set forth in the specification and more particularly pointed out in the appended claims.

Figure 1:
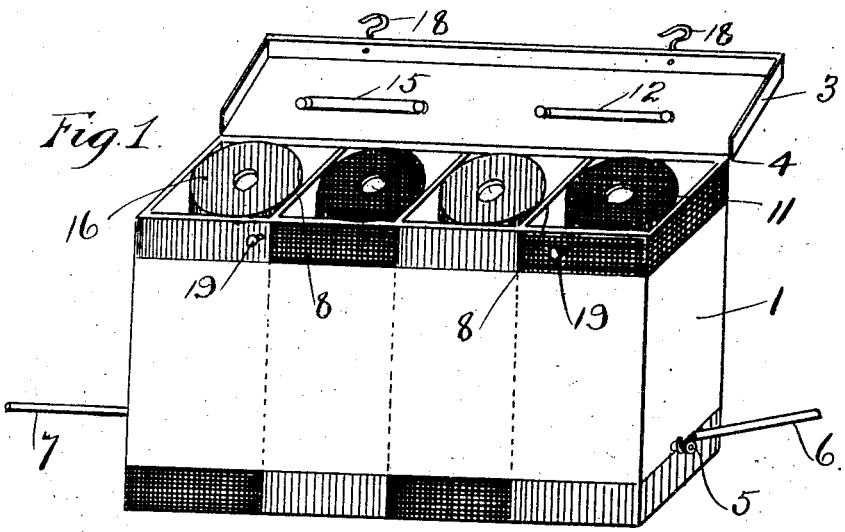
Figure 2:
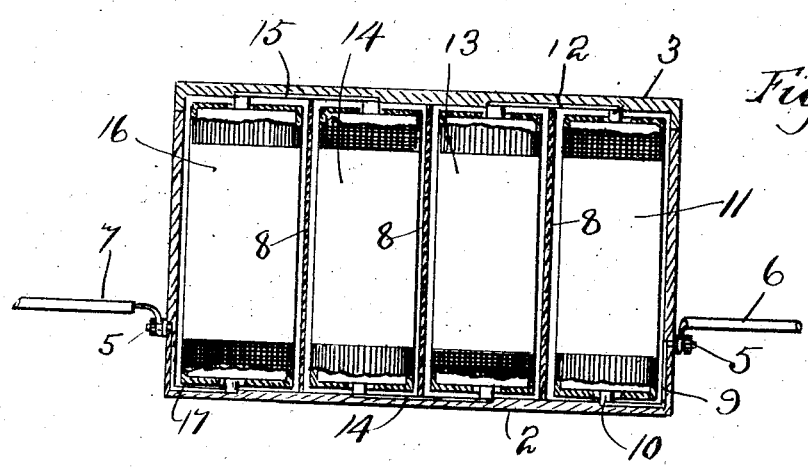
Figure 4:
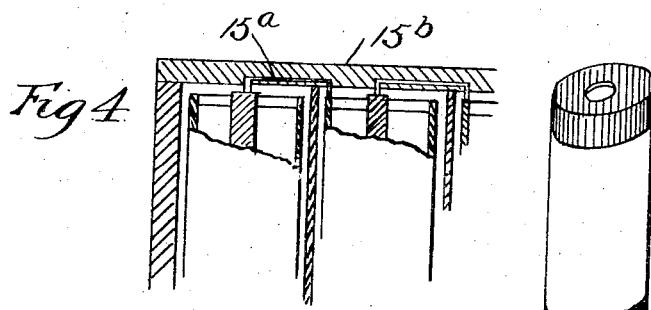
Figure 3:
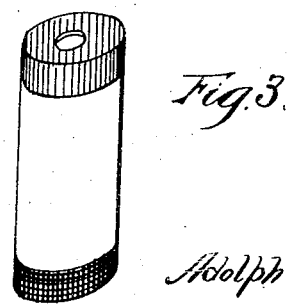

In the accompanying drawings: Figure 1—shows a casing or receptacle with permanent wire connections at its ends, said casing being divided into compartments and each end of each compartment being provided with means for designating which end of the cells shall be up and which down. Fig. 2—is a sectional view of the casing showing the cells therein and the method by which said cells are permanently connected top and bottom when the lid of the casing is closed. Fig. 3—is a detail showing one of the cells removed. Fig. 4—is a modification showing both the positive and negative poles of the cell on the same end and contacts 15ª and 15ᵇ in the lid by which these cells may be connected together all from one end, if desired.

Referring to the drawings at 1 is the casing or receptacle made in any convenient form and of any desired material. It is shown as having four side walls, a bottom portion 2 and a top portion 3 which top is preferably made in the form of a swinging lid hinged at 4 to the body of the casing. Permanent wire terminals 5 and 6 are made to this casing at each end thereof to which the conductors 6 and 7 are secured. The casing may also be divided up into a plurality of compartments, if desired, by means of the partitions 8—8 into which compartments may be dropped the individual cells.

At 9 is a permanent metallic connecting wire secured to the side of the box and leading down along the bottom of the same from the terminal 5 up at 10 to make a contact to the positive end of the first cell 11. Permanently located in the lid at 12 is a connection between the negative end of cell 11 to the positive end of cell 13. A permanent connection 14 is located in the bottom of the receptacle connecting the opposite ends of cells 13 and 14, and still another connection 15 in the lid connects cells 14 and 16. The lower end of this cell 16 being then connected through the permanent wire 17 to the terminal point 6 from which point the current is led away through the conductor 7. The above permanent connecting members may be made in the form of springs, if desired.

I have shown this receptacle as being made in the form of a box divided up into compartments but I do not confine myself to this construction as any form of receptacle may be used, as for instance, one having simply a top and bottom portion permanently wired as shown between which portions the cells may be placed and the whole secured or locked in position by suitable means.

The individual cells are preferably made of the dry battery type insulated on their outside and having a portion of the negative pole exposed at one end and a portion of the positive pole exposed at its opposite end. A special feature of my invention is that upon each end of these cells is placed a distinguishing mark to correspond with a like mark made on the receptacle or casing such for instance as the positive end of the cells being marked in red while the negative end is marked in black. The compartments in the receptacle are likewise designated so that when red comes to red and black to black the proper connection is sure to be made. I do not confine myself to the marking of these cells in colors as any distinguishing mark placed on one or both ends of the cell and the receptacle will accomplish this purpose and come within the spirit and scope of my invention.

In the operation of the device when it is found that the batteries are growing weak and it is desired to renew the same the permanent wire connections at 6 and 7 need not be disturbed, it simply being necessary to unlock the box by swinging back the hooks 18—18 from the pins 19—19 and opening the lid to the position shown in Fig. 1, the connection through the battery thus being broken. Any number of these cells may be removed and replaced by fresh ones, it being only necessary to see that the red and black ends correspond with like colors marked on the compartments of the casing. The lid is then closed and locked and the complete connection through the battery is thus readily made and the whole is ready for use again. A child of ordinary intelligence could make this change and do it correctly and in but a few minutes of time, as by this construction and simplicity of arrangement there is no possibility of a mistake being made.

The device is extremely simple and practical in construction and efficient in its operation and by its use much time, labor and annoyance is saved to one unskilled in the use and operation of electric batteries.

Having thus described my invention, what I claim as new and desire to secure by Letters Patent is:

1. A battery cell comprising a casing having two contact poles the connecting surface of each of said poles being located in a recessed portion formed in the casing of said cell whereby corresponding projections are required to enter said recesses to contact with said poles.

2. An electric battery comprising a casing, a plurality of battery cells in said casing both of the contact poles of each cell being located in recesses formed in the casings thereof, and electric conductors located in the battery casing comprising projections adapted to protrude into the said recesses to contact with said poles to complete the circuit.

3. An electric battery comprising a casing, a plurality of battery cells in said casing both of the contact poles of each cell being located in recesses formed in the casings thereof, and electric conductors located in the battery casing comprising projections adapted to protrude into the said recesses to contact with said poles to complete the circuit, and means on the battery casing and said cells for indicating the proper position of the cells within the casing.

In testimony whereof I affix my signature in presence of two witnesses.

ADOLPH T. VIGNERON.

Witnesses:
HOWARD E. BARLOW,
E. I. OGDEN.